United States Patent [19]

Urkowitz

[11] Patent Number: 5,151,702
[45] Date of Patent: Sep. 29, 1992

[54] COMPLEMENTARY-SEQUENCE PULSE RADAR WITH MATCHED FILTERING FOLLOWING DOPPLER FILTERING

[75] Inventor: Harry Urkowitz, Philadelphia, Pa.

[73] Assignee: General Electric Company, Moorestown, N.J.

[21] Appl. No.: 734,003

[22] Filed: Jul. 22, 1991

[51] Int. Cl.[5] ............................................. G01S 13/28
[52] U.S. Cl. .................................. 342/134; 342/145; 342/116
[58] Field of Search ............... 342/109, 111, 116, 132, 342/134, 145, 189, 196, 201

[56] References Cited

U.S. PATENT DOCUMENTS

| | | | |
|---|---|---|---|
| 4,153,900 | 5/1979 | Novak et al. | 342/201 |
| 4,156,876 | 5/1979 | Debuisser | 342/201 X |
| 4,176,351 | 11/1979 | DeVita et al. | 342/145 X |
| 4,353,067 | 10/1982 | Mims | 342/201 |
| 4,937,583 | 6/1990 | Poinsard | 342/196 X |

OTHER PUBLICATIONS

Colin et al., "Pulse Compression in Radars using Binary Phase Modulation", Electrical Communication, vol. 52, No. 2, 1977, pp. 152–157.
"Simulation Tool Speeds Doppler Radar Analysis" by R. Hancock, published at pp. 69–77 of the Jun. 1991 issue of Microwaves and RF magazine.
"Signal Processing Enhances Doppler Radar Performance" by P. Schumacher, published at pp. 79–86 of the Jun., 1991 issue of Microwaves and RF magazine.

Primary Examiner—Gilberto Barrón, Jr.
Attorney, Agent, or Firm—William H. Meise; Stephen A. Young; Carlos A. Nieves

[57] ABSTRACT

A radar generates first and second mutually complementary binary code sequences. The autocorrelation functions of the first and second pulse sequences are selected so that, in the sum of their autocorrelation functions, the main lobes add, and the sidelobes are of equal amplitude and opposite polarity, and therefore cancel. The radar sequentially transmits dispersed pulses in which the chips are phase modulated with the two codes. The received pulses are applied uncompressed to the input of a Doppler filter bank, which filters them into various Doppler channels, each representative of a particular radial velocity of the target. Within each channel, the received signals modulated by the first code are matched-filtered by a filter matched to the first code, to produce a first time-compressed pulse, and those modulated by the second code are matched-filtered by a filter matched to the second code, to produce a second time compressed pulse. The time-compressed pulses include a main lobe which represents the range of the target, and also include sidelobes which may introduce range ambiguity. The first and second time compressed pulses are added together in each Doppler channel, to produce, in each channel, range pulses in which the range sidelobes are suppressed. Thus, range sidelobe suppression is accomplished without the use of discrete range sidelobe suppressors.

11 Claims, 9 Drawing Sheets

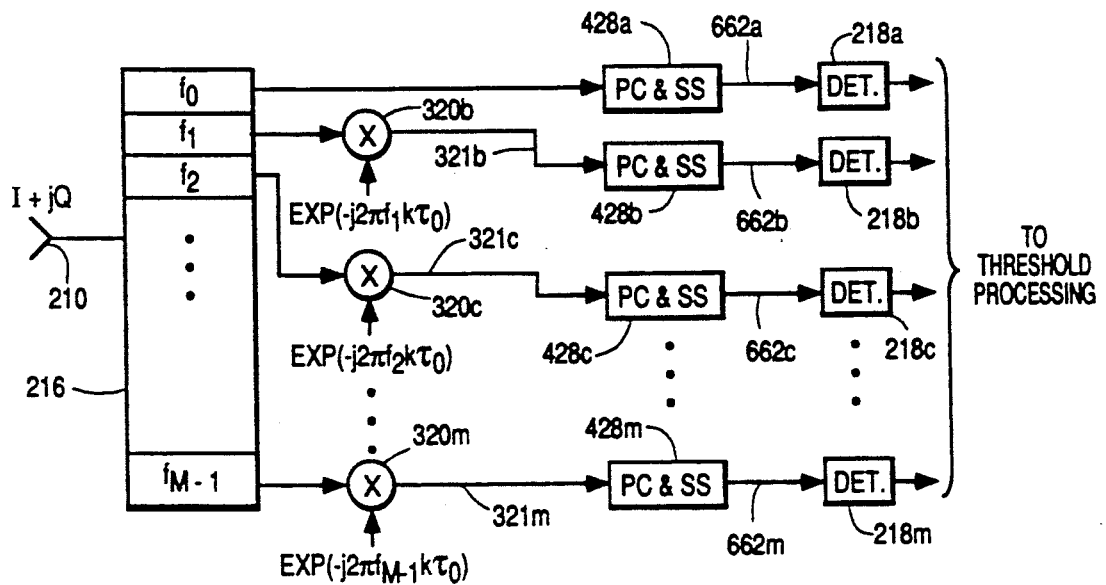
*FIG. 5*
*FIG. 6*
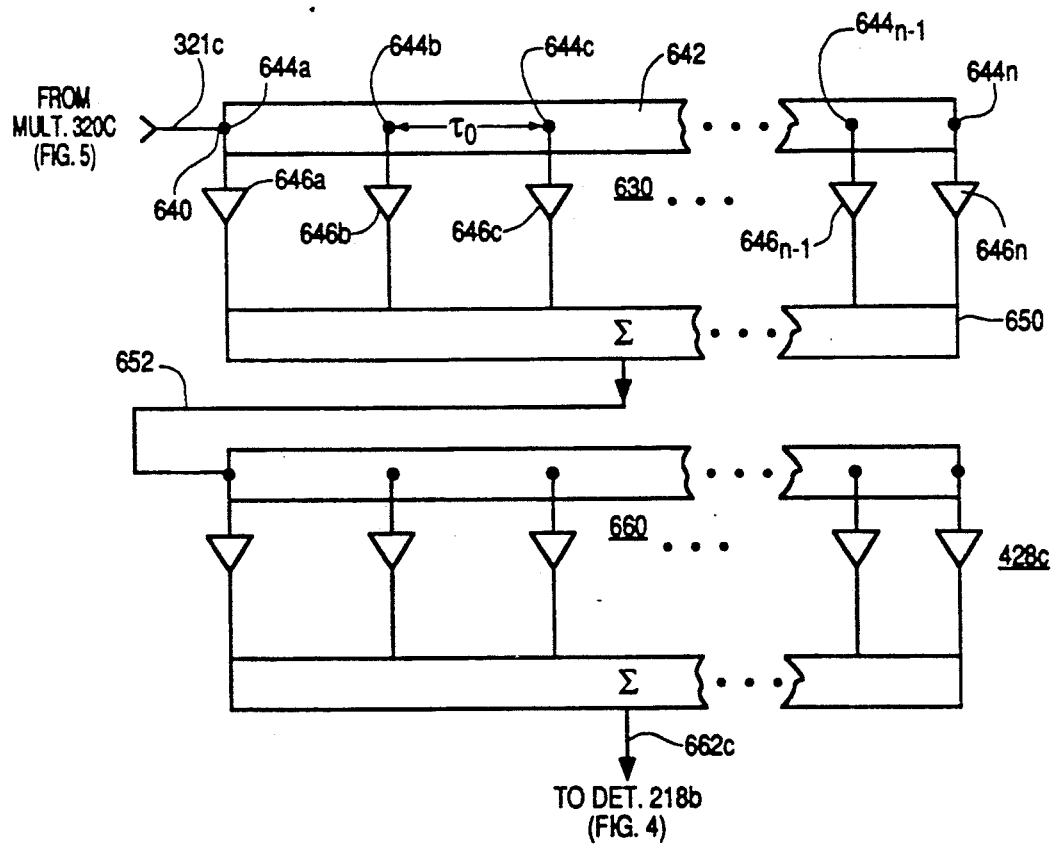

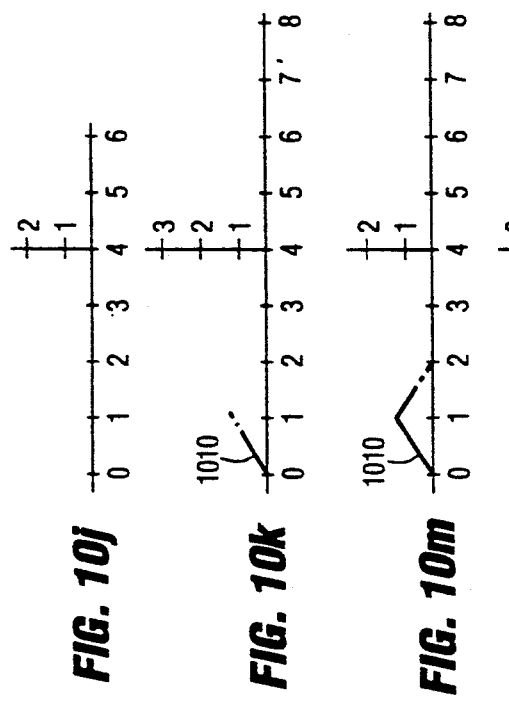 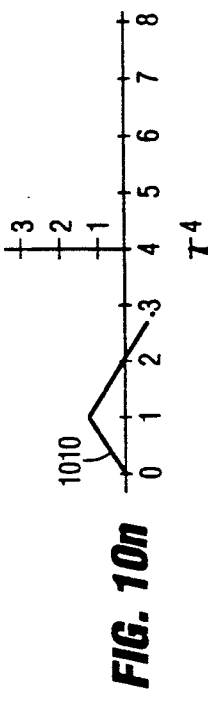 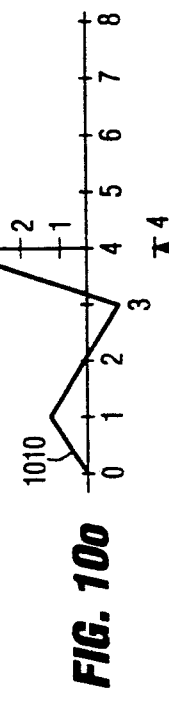 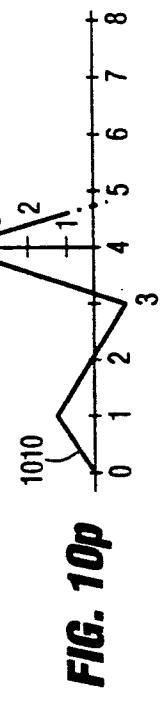
FIG. 10j  FIG. 10k  FIG. 10m  FIG. 10n  FIG. 10o  FIG. 10p
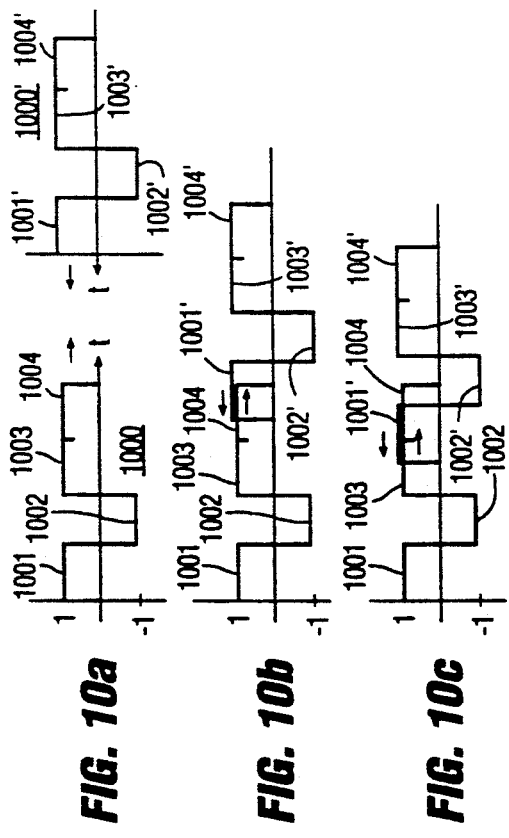 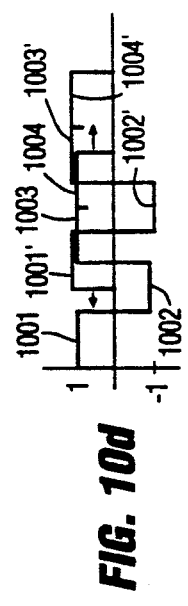 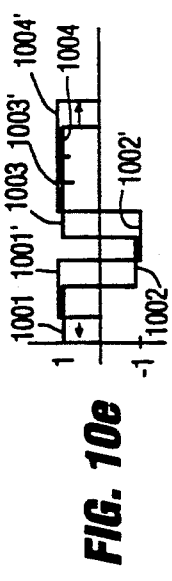 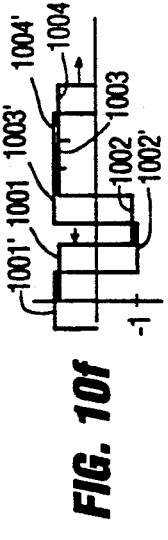
FIG. 10a  FIG. 10b  FIG. 10c  FIG. 10d  FIG. 10e  FIG. 10f

COMPLEMENTARY-SEQUENCE PULSE RADAR WITH MATCHED FILTERING FOLLOWING DOPPLER FILTERING

This invention relates to radar systems generally, and more specifically to arrangements for reducing range sidelobes in radar systems using Doppler processing of received echoes.

The high speed and long range of modern airborne vehicles places increasing range demands on radar systems used for tracking. The long-range requirement also requires the use of relatively high transmitted power to reliably detect small targets. High transmitted power implies a relatively higher peak transmitter power or a longer duration transmitter pulse (also known as a "wider" pulse). Assuming a maximum available peak power, longer range implies a longer duration transmitted pulse. A longer duration pulse tends to reduce range resolution, which is the ability to distinguish among targets which are at similar ranges. Pulse compression techniques can be used to improve range resolution in spite of the longer pulse duration, thus eliminating the need for high peak power short pulses, but the minimum range at which a target can be detected increases with the transmitted pulse length. Thus, if the transmitter pulse duration is 100 microseconds ($\mu$s), the minimum distance at which a target may be detected is about 8 nautical miles (nm). Clearly, a radar using pulses of such a duration cannot be used to detect close-in targets, as for example aircraft which are landing or taking off from an airport at which the radar is situated. An additional problem associated with pulse compression is the appearance of range sidelobes (as distinguished from antenna sidelobes) in addition to the main range lobe. The time position, or range, of the main lobe is the position that is tested for the presence of a target and for estimating the parameters of that target (reflected energy or power, closing speed, fluctuations in echo power and closing speed, etc.). The presence of range sidelobes on the compressed pulse results in interfering echoes which originate at ranges other than the range of the main lobe. This interference, known as "flooding," can cause erroneous estimates of the echo characteristics in the range cell (i.e., range increment) covered by the main lobe. Prior art techniques for suppressing range sidelobes include the "zero-Doppler" technique, in which the range sidelobe suppression scheme is based in part upon the assumption that the interfering echoes, as well as the desired echo, have a closing velocity that has no significant Doppler phase change or shift over the duration of the uncompressed pulse. The Doppler phase shift $\phi_{DV}$ across the uncompressed pulse is $2\pi$ times the product of the Doppler frequency shift and the uncompressed pulse duration (i.e. $\phi_{DV} = 2\pi f_d T_O$ radians). When this Doppler phase shift is actually zero or very small, moderate sidelobe suppression is achievable with the zero Doppler design. However, the zero Doppler design is very sensitive to small Doppler frequency shifts, making deep sidelobe suppression impossible for radar applications in which very deep sidelobe suppression is desired, as for example in weather mapping, clear air turbulence detection, and microburst detection.

Copending U.S. patent application Ser. No. 07/685,792, filed Apr. 16, 1991 in the name of Urkowitz, describes a pulse radar system in which Doppler processing is used to separate returns into frequency bins representative of radial speed. Interference from scatterers at other ranges is reduced by range sidelobe suppression filtering applied to the signal in each frequency bin. A radar with an improved range sidelobe suppression arrangement is desired.

SUMMARY OF THE INVENTION

In a radar system, first and second pulse sets are recurrently transmitted. The first set of pulses is dispersed in time pursuant to a first phase code, and the second set of pulses is dispersed in time pursuant to a second phase code which is complementary to the first. The echoes from the target are received to form received first and second pulse sets. The echoes are processed by separation into frequency bins, ordinarily referred to as Doppler filtering. Thus, the received pulse sets are separated by frequency, and also by incremental time of receipt, which corresponds to range. Within each frequency band, the received first pulse set is filtered by a first-code-matched filter, and the second pulse set is filtered by a second-code-matched filter. The matched-filtered received first and second pulse sets have range sidelobes which are of mutually opposite polarity. The matched-filtered received first and second pulse sets, after suitable delay of the matched filtered received first set, are summed together, whereby the range main lobes add and the range sidelobes cancel.

In a particular embodiment of the invention, the Doppler-filtered returned pulses are received sequentially. A first code-matched filter filters the first pulse sequence, and a switch is operated between the end of the first pulse sequence and before the beginning of the second pulse sequence, to decouple the first code-matched filter, and to couple in-line a second code-matched filter. The second code-matched filter then filters the second pulse sequence. A delay associated with the first code-matched filter delays the matched-filtered first pulse sequence until matched filtering of the second pulse set is accomplished, whereupon the delayed first set is summed with the first set.

DESCRIPTION OF THE DRAWING

FIG. 5 is a simplified block diagram of another improved range sidelobe suppression arrangement which may be used in the radar of FIG. 1, as described in the above mentioned Urkowitz application;

FIG. 6 is a simplified block diagram of a pulse compression and range sidelobe suppression filtering portion of the arrangement of FIG. 5;

Figure 1:
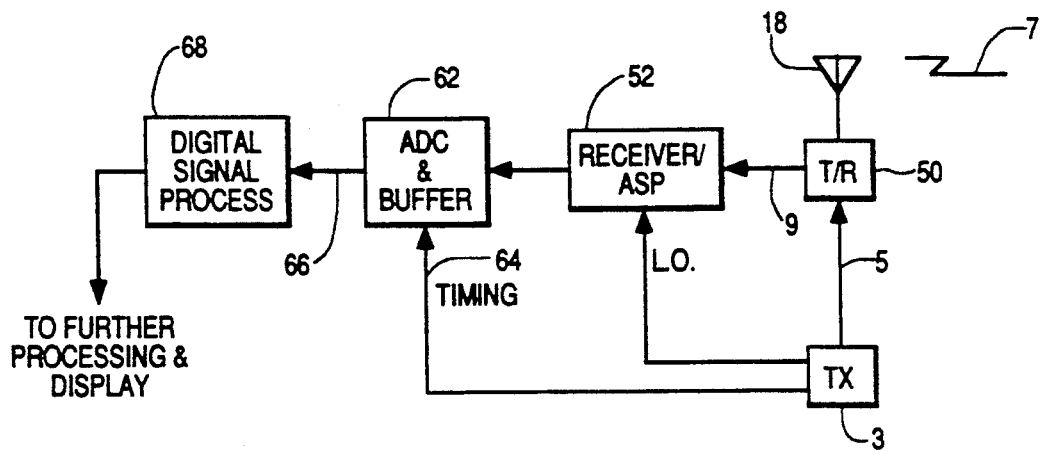
FIG. 1 is a simplified block diagram of a radar system as described in the abovementioned Urkowitz patent application.
Figure 3:
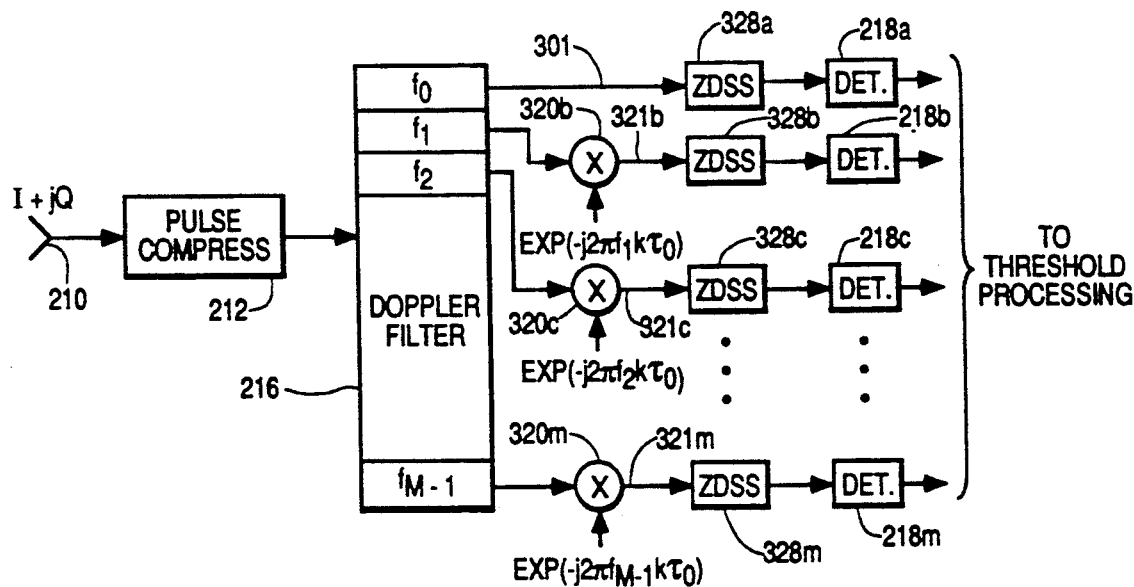
FIG. 3 is a simplified block diagram of an improved range sidelobe suppression arrangement which may be used in the radar of FIG. 1, as described in the abovementioned Urkowitz application.
Figure 8:
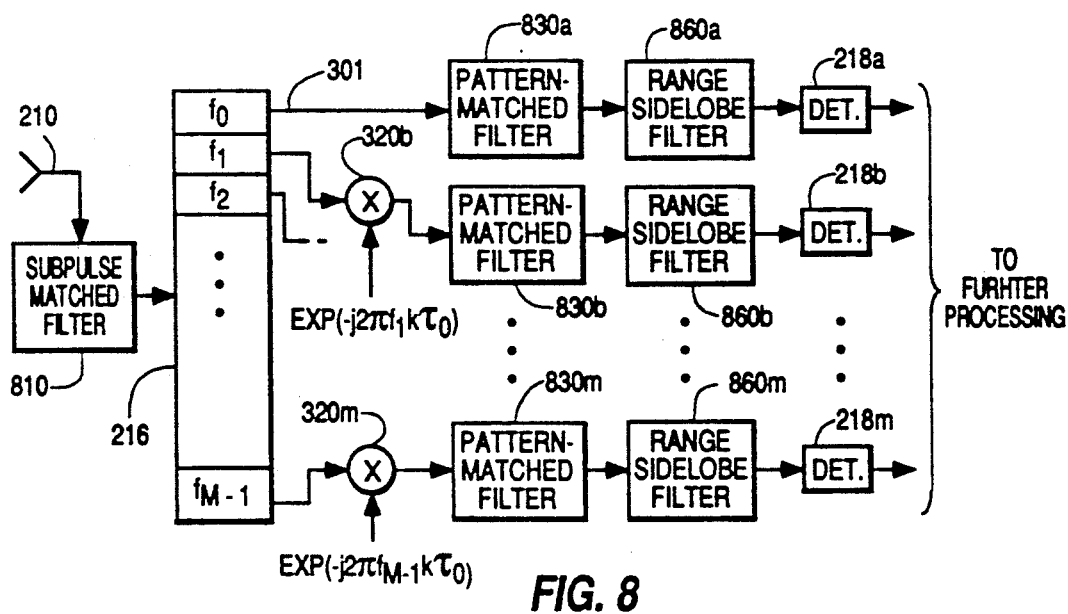
FIG. 8 is a simplified block diagram of the arrangement of FIG. 5 using the principle of the filter of FIG.
Figure 9:
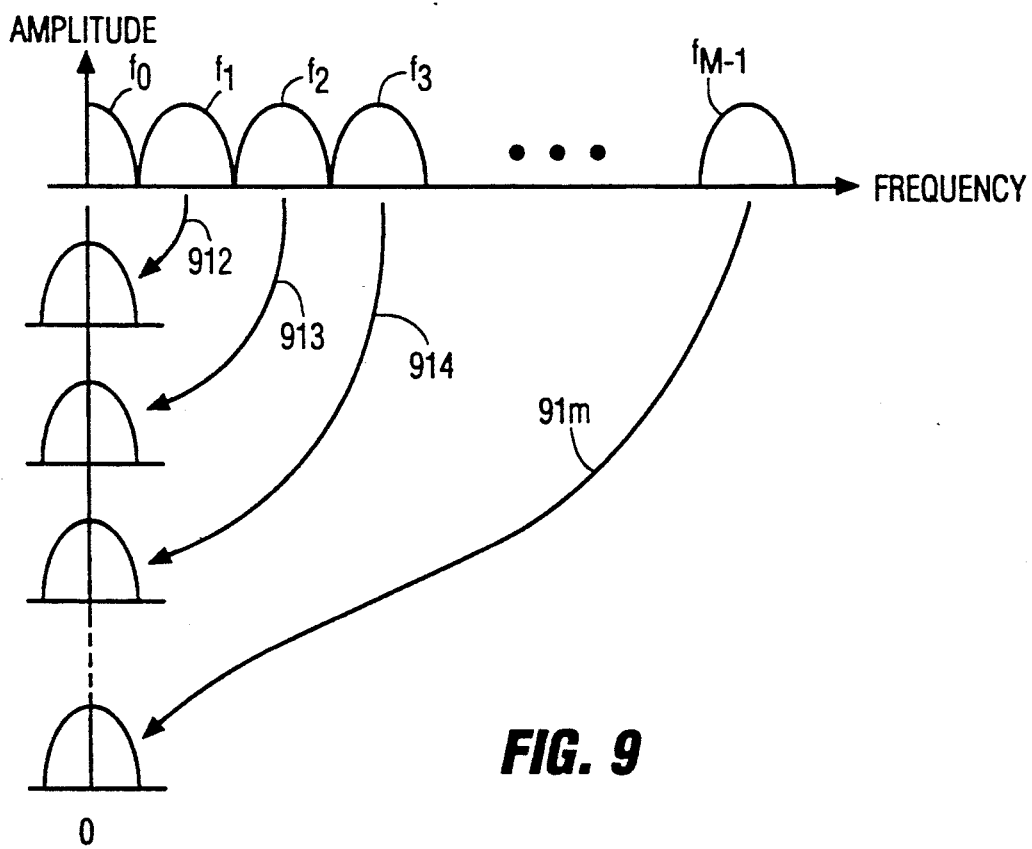
Figure 10G:
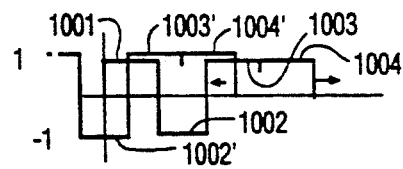
Figure 10Q:
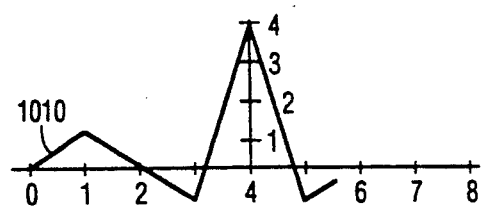
Figure 10H:
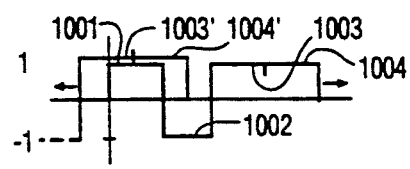
Figure 10R:
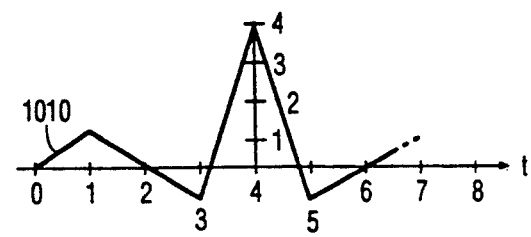
Figure 10I:
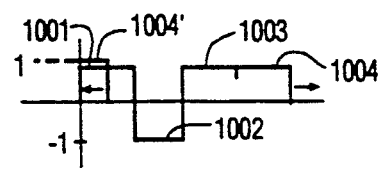
Figure 10S:
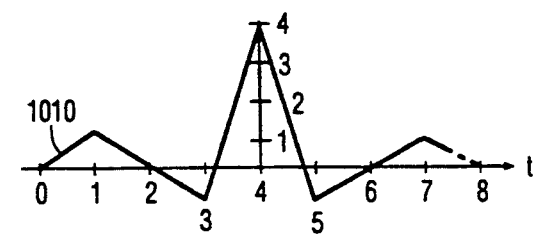
Figure 11A:
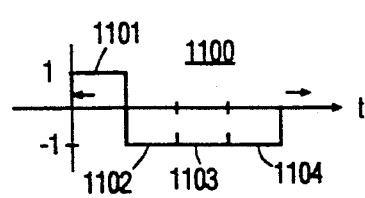
Figure 11B:
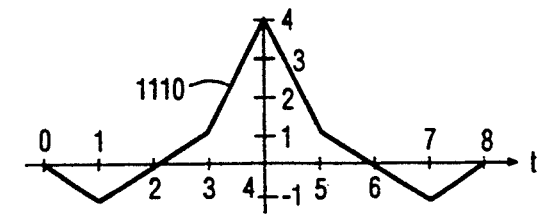
Figure 12:
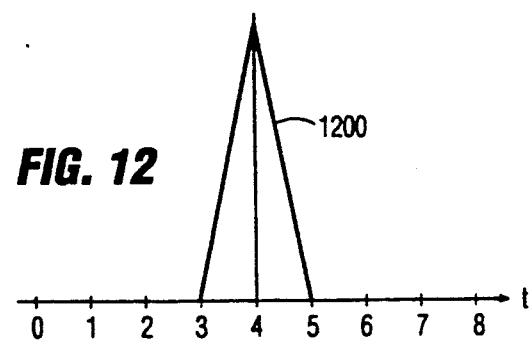
Figure 13:
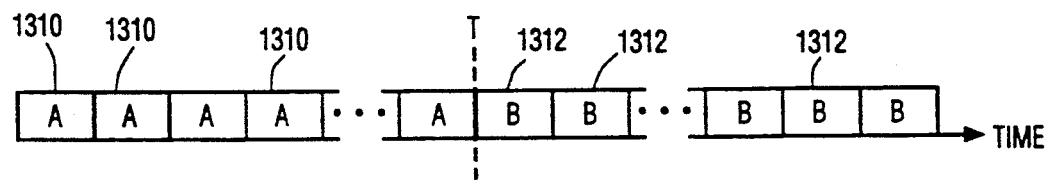
Figure 14:
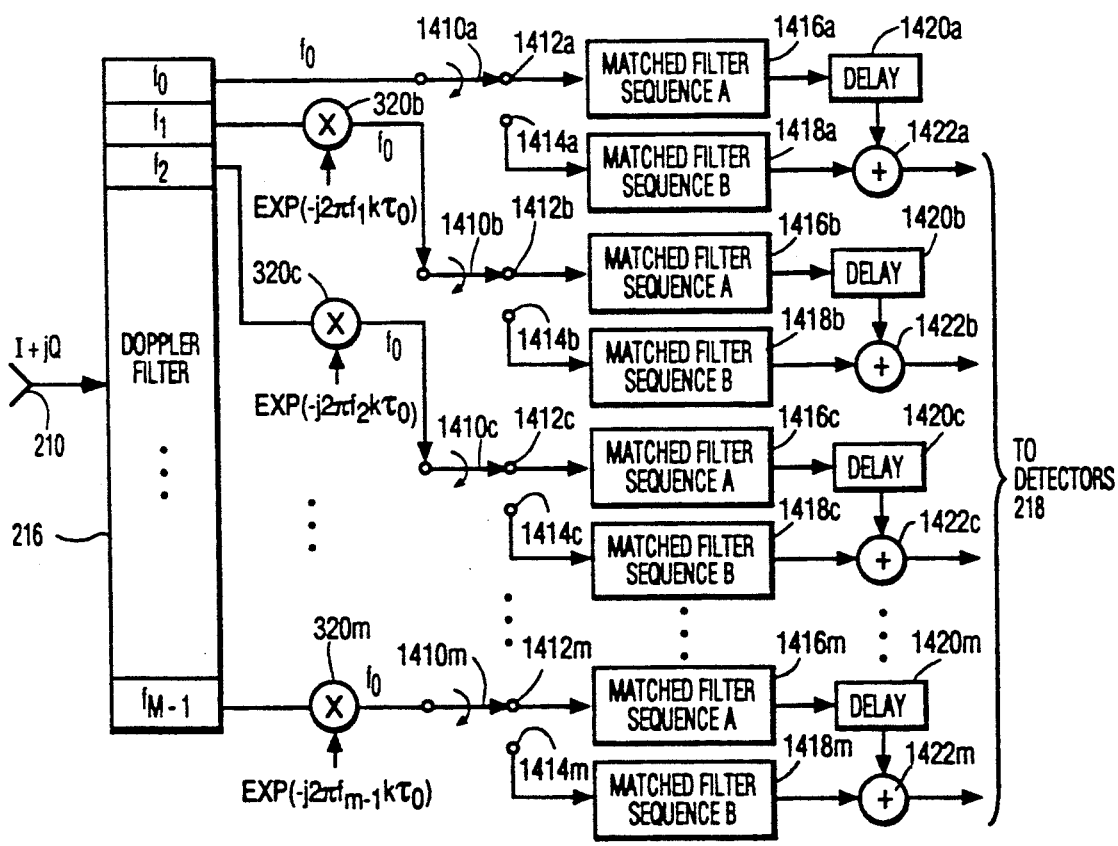
Figure 15A:
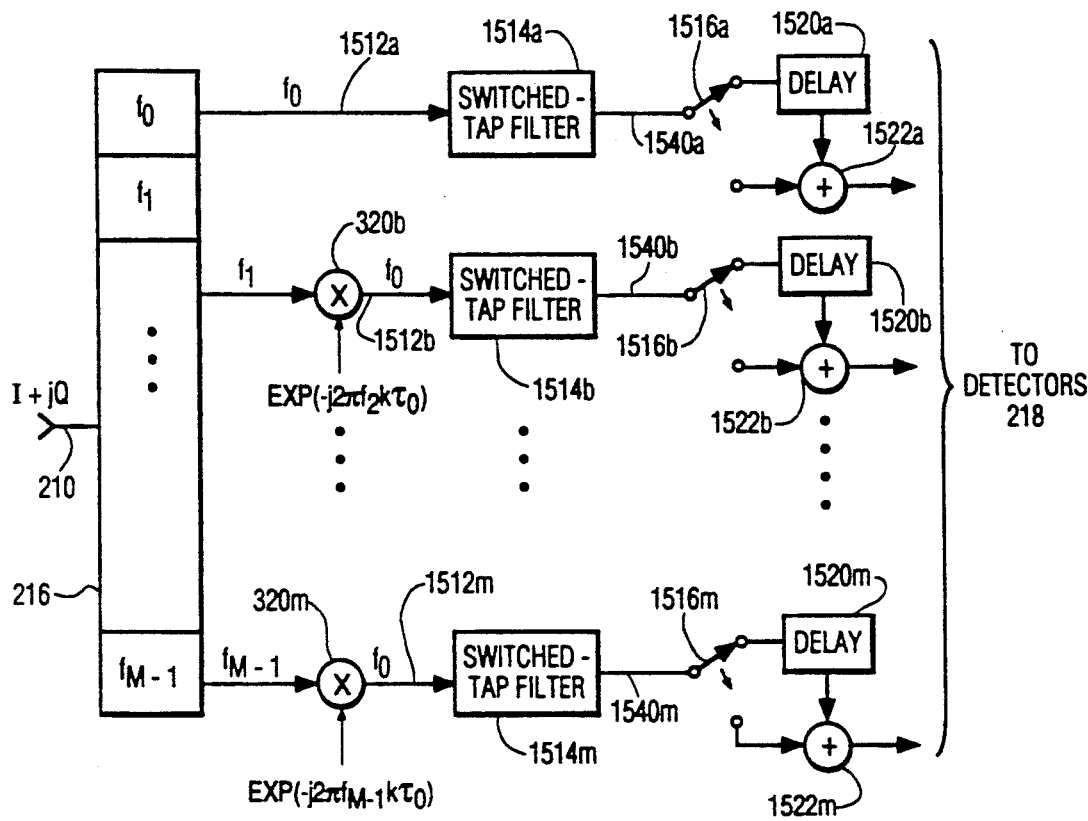
Figure 15B:
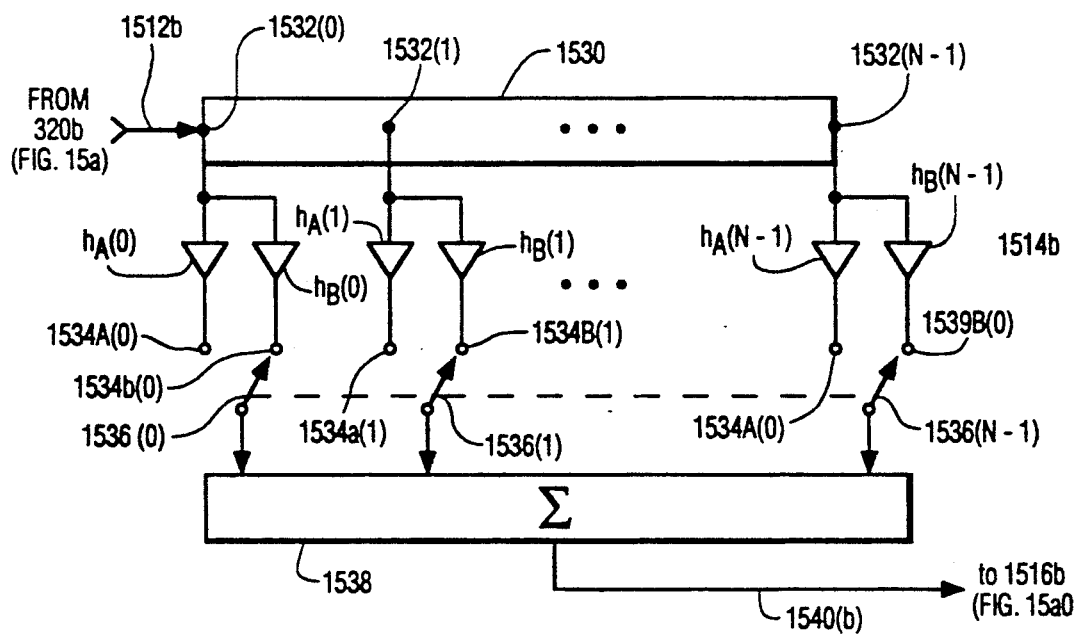

7, rearranged to have a lower parts count, as described in the abovementioned Urkowitz application:

FIG. 9 represents amplitude-frequency spectra and the way they are rearranged in FIGS. 3, 5 and 8;

FIGS. 10a-10i, collectively referred to as FIG. 10, are amplitude-time representations useful in explaining autocorrelation of the subpulses of a pulse set;

FIGS. 10i-10s are amplitude-time representations of the results of the autocorrelations of FIGS. 10a-10i, respectively;

FIGS. 11a and 11b illustrate a pulse set which is complementary to the pulse set of FIG. 10, and the result of its autocorrelation, respectively;

FIG. 12 represents the summing of the autocorrelated waveforms of FIGS. 10 and 11;

FIG. 13 represents a pulse transmitted by the arrangement of FIG. 1 in order to allow processing by the arrangement of FIG. 14;

FIG. 14 is a simplified block diagram of a signal processor according to the invention, for performing matched filtering of first and second complementary pulse sets; and FIG. 15a is a simplified block diagram of a signal processor according to the invention, for performing matched filtering of first and second complementary pulse sets, and FIG. 15b is a simplified block diagram of a structure useful in performing matched filtering with differing weights in the arrangement of FIG. 15a.

DESCRIPTION OF THE INVENTION

FIG. 1 is a simplified block diagram of a radar system as described in the abovementioned Urkowitz application. In FIG. 1, an antenna 18 is connected by way of a transmit-receive (T/R) duplexing or multiplexing system 50 to a transmit controller (TX)3. Controller 3 establishes system the pulse duration, PRF, frequency and the like, and provides other control functions including generation of local oscillator and tuning signals. Antenna 18, controller 3 and T/R 50 together cause transmission of electromagnetic signals, illustrated as 7, and couple echoes of the electromagnetic signals received by antenna 18 by a path 9 to a receiver and analog signal processor (ASP) 52 for low-noise amplification, frequency downconversion, and the like, with the aid of local oscillator (L.O.) signals. In their broadest concept, there are conventional radar techniques. The resulting baseband signals may, in general, include orthogonal inphase (I) and quadrature (Q) components. The baseband signals are applied from receiver/ASP 52 to an analog-to-digital converter (ADC) associated with a block 62, which converts the analog baseband signals to digital form with the aid of system timing signals. The "range clock" portion of the timing signals establishes the smallest time interval into which the received signals are quantized, and therefore establishes the smallest discernible target range increment.

As described in the abovementioned Urkowitz application, a buffer may be associated with ADC 62 of FIG. 1 for purposes unrelated to the present application. The digital signals are coupled from ADC 62 (or its buffers, if used) to a digital signal processor (DSP) 68.

Figure 2:
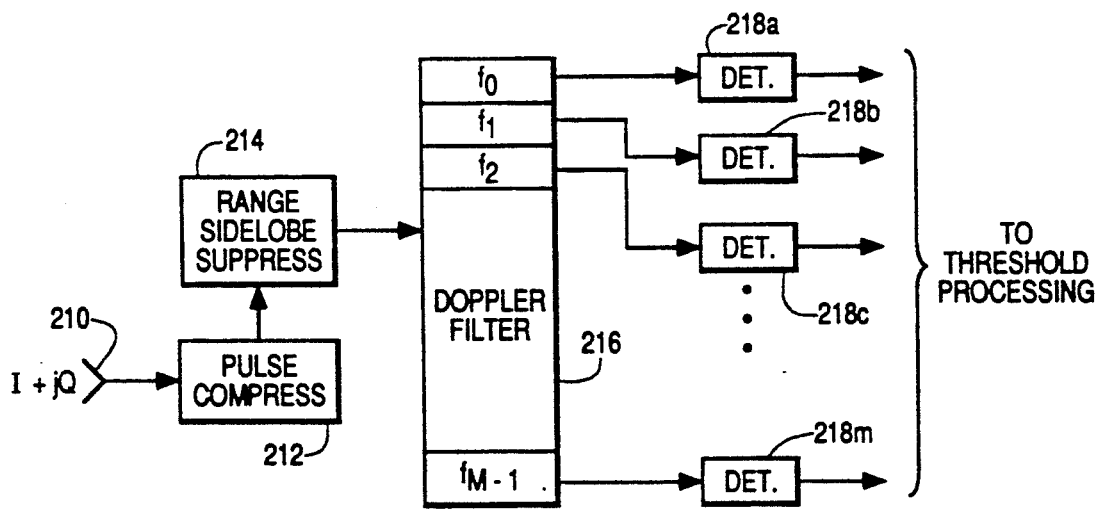
FIG. 2 is a simplified block diagram of a portion of the arrangement of FIG. 1 illustrating a prior art range sidelobe suppression arrangement.

FIG. 2 is a simplified block diagram of a portion of the processing which might be included in DSP block 68 of FIG. 1 for prior-art range sidelobe reduction. In FIG. 2, an I+jQ signal from the complex analog-to-digital converter in block 62 is applied by way of an input port 210 to a pulse compressor illustrated as a block 212. The input I+jQ signal is desirably in digital form, but may be analog, and represents a sequence of pulses reflected from the target at a particular beam position. Pulse compressors are known in the prior art and may be implemented, for example, by a surface acoustic wave (SAW) filter matched to the transmitted pulse code in an analog system before the downconversion to baseband I+jQ, or as a processor in a digital system. The output of pulse compressor 212 is a relatively short-duration pulse with unwanted range sidelobes. A range sidelobe suppressor 214 acts on the compressed pulse to reduce the range sidelobes. Range sidelobe suppressor 214 may be implemented as a further processor operating upon digital I+jQ baseband signal. Such a processor is designed on the assumption of zero Doppler shift. As in the case of the pulse compressor, range sidelobe suppression, based upon the same assumption of zero Doppler shift, may instead be applied by a further SAW filter in the analog portion of the radar receiver before conversion to digitized baseband I+jQ. However, such an approach is not Doppler tolerant and represents prior art over which the arrangement of the abovementioned Urkowitz application is an improvement. The compressed, sidelobe reduced pulses are applied from suppressor 214 to a bank of narrowband Doppler filters illustrated together as a filter bank 216. Each filter element of bank 216 responds to a particular narrow frequency band $f_0, f_1, f_2 \ldots f_{M-1}$, thereby separating the incoming signal into a plurality of frequency bins, the frequencies of which depend upon the Doppler frequency attributable to the radial velocity of the target. FIG. 9 illustrates a baseband spectrum $f_0$ and additional spectra $f_1, f_2, f_3 \ldots f_{M-1}$, which together represent the output signals from filter bank 216. An echo having a given Doppler shift produces a substantial output from only one filter output. For best velocity selectivity, the bandwidths of filter elements $f_0, f_1, f_2 \ldots f_{M-1}$ of filter bank 216 of FIG. 2 are narrow, in the range of a few Hertz or less. The bank of Doppler filters represented as block 216 may be implemented by a signal processor performing a discrete Fourier transform (DFT) by means of a fast Fourier transform (FFT) algorithm. The output of each filter is a range trace which is the sum of a sequence of Doppler filtered range traces. A particular filter output, therefore, represents target echoes having the particular Doppler frequency shift corresponding to its center frequency, and a small range of Doppler shifts about that center frequency, which depends upon the bandwidth of the filter. The output of each filter is coupled to a corresponding amplitude detector 218a, 218b, 218c ... 218m, to generate signals which, when arrayed, can be sorted according to the velocity of the target by selecting the appropriate detector output. Thus, the presence of a target signal at the output of a Doppler filter indicates that the target has a particular radial velocity. Within each Doppler frequency bin, the target range is known from the time of arrival of the signal. The signals produced by detectors 218 are coupled to threshold circuits in DSP block 68, to allow separation of significant returns from noise, and thence for further processing. The circuits fed by the various Doppler filter elements $f_0, f_1, f_2, \ldots f_{M-1}$, may each be considered a "Doppler channel." Thus, filter element $f_0$ and detector 218a constitute a Doppler channel relating to targets with a low radial velocity, while filter element $f_2$ and detector 218b together constitute another Doppler channel relating to targets with a larger radial velocity, corresponding to $f_2$.

In the context of the Urkowitz application, DSP block 68 of FIG. 1 may perform the functions of (a) pulse-to-pulse Doppler filtering by means of a Fast Fourier Transform (FFT) algorithm, with data weighting to control signal leakage from neighboring Doppler shifts (frequency leakage); (b) digital pulse compression; (c) range sidelobe suppression; and (d) further signal processing including CFAR (constant false alarm rate) processing, thresholding for target detection, spectral processing for weather mapping, etc. Items (a) and (d) are performed in ways well understood in the art, and form no part of the invention. The range sidelobe suppression (c) is advantageously Doppler tolerant as described in the abovementioned Urkowitz application, and as described below in conjunction with FIGS. 3-9. The results of the processing done in block 68 may include (a) target detection reports (aircraft); (b) radar track detection reports; (c) weather components for each resolvable volume of space, including (c1) echo intensity; (c2) echo closing speed, and (c3) spectral spread of the echo, and these components of information may be included in Digitized Radar Detection Reports (DRDR). The DRDR reports may also include data relating processing. A person skilled in the art of pulse compression will know that the radar pulse must be coded in some manner that allows DSP block 68 to correlate received signals with the known transmitted pulse code. The correlation process simultaneously improves the signal-to-noise ratio and the range resolution of target echoes. A person skilled in the art knows that a variety of satisfactory pulse coding techniques are available in the prior art. Such techniques include the well known Barker Codes, pseudorandom noise codes, and linear FM coding techniques. DSP block 68 therefore also performs digital pulse compression on the received signals.

As mentioned, the pulse compression in block 312 of FIG. 2 gives rise to range sidelobes, which are in the form of amplitude responses representing times other than the actual time of the return from the target in question, and thus represent other possible ranges. This introduces an ambiguity or error in the apparent echo from a specific resolvable range interval because the echoes from other range intervals "flood" into the range interval of interest from the range sidelobes. The reason is that the total echo at any instant of time is the RF sum of all the echoes from all ranges covered by the compressed pulse with its range sidelobes or suppressed range sidelobes. As described in the aforementioned Urkowitz application, the range sidelobe suppression represented by block 214 may provide substantial range sidelobe suppression for certain phase shifts attributable to the Doppler frequency shift, and less suppression at other phase shifts. Thus, the prior art range sidelobe suppression can be optimized for a particular value of radial velocity of a target, but provides less suppression at other velocities.

The quantity which controls the sensitivity of the range sidelobe suppression is the product of the uncompressed transmitter pulse duration and the Doppler frequency shift. The product may be measured as the Doppler phase shift over the uncompressed pulse duration.

In accordance with an aspect of the improvement described in the abovementioned Urkowitz application, range sidelobes are suppressed by a technique which includes separating the sequence of target echoes or pulses into a plurality of Doppler or frequency "bins", and applying range sidelobe suppression to each bin separately.

This is illustrated in the simplified block diagram of FIG. 3. Elements of FIG. 3 corresponding to those of FIG. 2 are designated by like reference numerals. The processor of FIG. 3 uses a plurality of range sidelobe suppressors $328a$, $328b$, $328c$ . . . $328m$, one of which is associated with each Doppler filter element $f_0$, $f_1$, $f_2$, . . . $f_{M-1}$ of Doppler filter bank 216, i.e. with each Doppler channel. It would be possible to make each range sidelobe suppressor with different filtering parameters to optimize the range sidelobe suppression for the center frequency of the associated Doppler filter element. This would substantially improve the overall range sidelobe suppression, because the range of frequencies at the output of each filter is small, on the order of a few Hertz. This may represent a small percentage of the center frequency of the filter. Thus, each range sidelobe suppressor may be optimized at one frequency, and its performance will not be excessively degraded by the small phase shifts attributable to a range of frequencies which is a small percentage of the optimized frequency. To avoid the need for different suppression parameters in each of the range sidelobe suppressors so that identical suppressors may be used for cost reasons, the filtered output signal from each filter element of filter bank 1216 (except the lowest-frequency filter element $f_0$) is converted to a common frequency range. A suitable range is the "baseband" range of filter element $f_0$, which may for example be the range extending from zero Hertz to a few Hertz. In FIG. 3, the output from filter element $f_0$ of filter bank 216 is applied directly to a Zero Doppler Sidelobe Suppressor (ZDSS) $328a$, because the output frequency range of filter element $f_0$ is already at baseband, and therefore no frequency conversion is necessary. The outputs from all the other filter elements $f_1$, $f_2$ . . . $f_{M-1}$ are individually applied to multipliers 320 for converting each filter output to baseband. For example, filter element $f_1$ of filter bank 216 has its output connected to a first input port of a multiplier $320b$. Multiplier $320b$ has a second input port coupled to an oscillation source (not illustrated in FIG. 3) of signal $$\exp(-j2\pi f_1 k\tau_0), k=0, 1, \ldots$$

where
$f_1$ is the center frequency of the corresponding filter element of filter bank 216,
$\tau_0$ is the range sampling period, and
k is the integer time index.

The oscillator frequency is thus the negative (i.e., same absolute frequency but 180° out-of-phase) of the center Doppler frequency at which the corresponding filter element of filter bank 216 is centered. For example, the oscillator signal $\exp(-j2\pi f_2 k\tau_0)$ applied to multiplier $320c$ is the negative of frequency $f_2$ at which filter element $f_2$ of filter bank 216 is centered. Any initial phase shift associated with the oscillator signal is unimportant, because eventually only the magnitudes of the Doppler channel signals are used. Essentially, the output signals of the individual elements $f_1$, $f_2$ . . . $f_{M-1}$ of Doppler filter bank 216 are heterodyned by multipliers 220 to be centered at zero frequency, whereupon identical zero frequency Doppler range sidelobe suppressors (ZDSS) 328 may be used in each Doppler channel. For example, ZDSS $328a$ is coupled to filter element $f_1$, and provides baseband range sidelobe reduction; ZDSS $328b$ is coupled to the output of multiplier $320b$ for receiving therefrom filtered signals originally at $f_1$ but downconverted to baseband, and suppresses sidelobes in the baseband signal. The process of downconversion is illustrated generally in FIG. 9, in which filtered signals at frequencies $f_1 \ldots f_{M-1}$ are converted to baseband by the multiplying processes represented by arrows 912, 913, 914, ... 91m. Each of the other ZDSS 328c ... 328m of FIG. 3 also receives signals downconverted to baseband. Thus, all ZDSS are identical. The outputs of ZDSS 328a ... 328m are applied to detectors 218a ... 218m, respectively. The detected signals in each channel are coupled for thresholding and further processing, in known manner.

Figure 4:
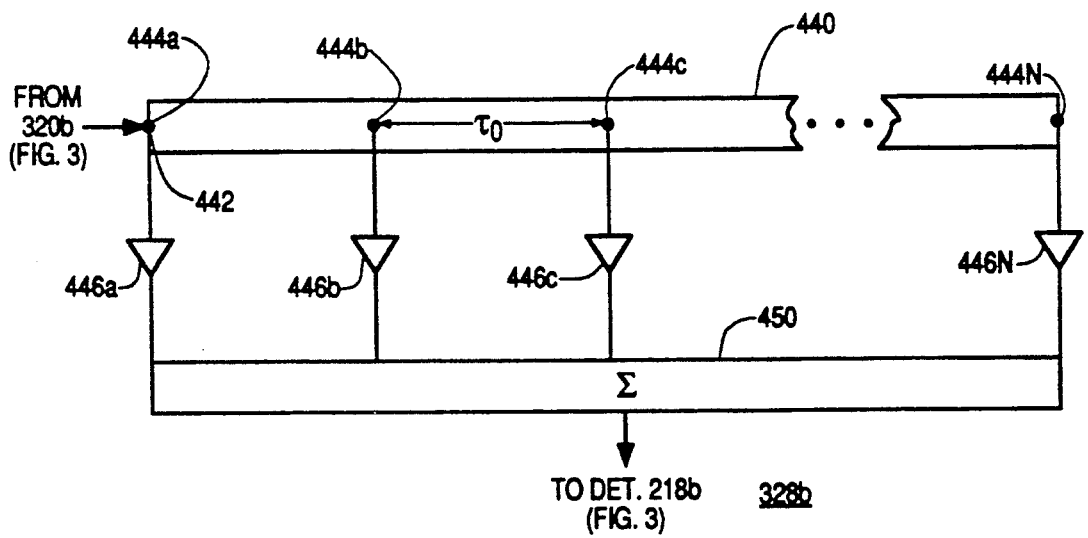
FIG. 4 is a simplified block diagram of a portion of the arrangement of FIG. 3.

FIG. 4 illustrates a tapped delay line or transversal filter of the type known as a "finite impulse response" (FIR) filter, because a change in the input causes a change in the output which extends over a finite time. The FIR filter of FIG. 4 may be used as any range sidelobe suppressor 328 in the arrangement of FIG. 3. For definiteness, the structure of FIG. 4 represents zero Doppler sidelobe suppressor (ZDSS) 328b of FIG. 3. As illustrated, ZDSS 328b of FIG. 4 includes a delay structure 440 which receives signal at its input port 442 and causes the signal to propagate to the right, past taps illustrated as nodes 444a, 444b ... 444n. The temporal spacing (delay) between adjacent taps equals range sampling period $\tau_0$. The delay structure, if in digital form, may be a shift register. Each node 444 is coupled to a tap weight multiplier illustrated by a triangular symbol 446a, 446b ... 446n. The weighted, delayed signals from multipliers 446 are applied to a combinatorial summer ($\Sigma$) 450 for producing the desired filtered or range sidelobe suppressed signals. The summed signals are applied from the output of summer 450 to detector 218b of FIG. 3. The number of taps, and the weights to be applied.

FIG. 5 is a simplified block diagram of another arrangement described in the above-mentioned Urkowitz application, which is better suited to larger Doppler frequency shifts and/or larger duration-bandwidth products than the structure of FIG. 3. Elements of FIG. 5 corresponding to those of FIG. 3 are designated by like reference numerals. In FIG. 5, the I+jQ signal, representing the complex envelope of the radar echo, plus whatever receiver noise is combined with the echo, is applied by way of port 210 to Doppler filter bank 216, without being pulse-compressed. Filter bank 216 separates the signal into frequency bins, and applies the signal in each bin to a separate processor 28, which performs the functions of both pulse compression and range sidelobe suppression (PC & SS). As with the arrangement of FIG. 3, the output from the lowest-frequency bin, namely the $f_0$ bin, is applied directly to its associated processor 428a, without a multiplication or frequency conversion. The output signals from filter elements $f_1$ though $f_{M-1}$ are individually applied to a corresponding multiplier 320. For example, the output port of filter element $f_2$ of filter bank 216 is applied to an input of a multiplier 320c. Multiplier 1420c also receives from a source (not illustrated in FIG. 15a) an oscillation signal $\exp(-j2\pi f_2 k\tau_0)$ which is the negative of the center frequency of filter element $f_2$. As described above, this has the effect of converting the signal output of filter element $f_2$ to baseband. The baseband signal at the output of multiplier 320c is applied over a data path 321c to PC & SS 428c. The output signals of each of the other filter elements of filter bank 216 (except filter element $f_0$) are similarly processed, with the result that all the filter element output signals are converted to baseband signals with a bandwidth corresponding to that of the filter element. As mentioned, the bandwidth is small, on the order of a few Hertz or less.

FIG. 6 is a simplified block diagram of a signal processor 428 which may be used in FIG. 5. For definiteness, FIG. 6 represents pulse compression and range sidelobe suppressor processor 428c of FIG. 5. In FIG. 6, processor 428c includes a cascade of two FIR filters 630, 660. Downconverted signals from multiplier 420c of FIG. 5 are applied to the input port 640 of a delay line (analog) or shift register (digital) 642, which allows the signals to propagate to the right. A set of taps 644a, 644b ... 644n spaced by $\tau_0$, the range sample interval, samples the propagating signal and applies the samples to a set of multipliers 646 which weight the samples. A combinatorial summing ($\Sigma$) circuit 650 sums the weighted signal samples to produce an intermediate filtered signal on a data path 652. The intermediate filtered signal is applied by way of data path 652 to a second FIR filter 660, which is structurally similar to filter 630, but may have different delay, number of taps and tap weights. Filter 660 produces a pulse compressed, range sidelobe suppressed signal on a data path 662c for application to corresponding magnitude detector 218c of FIG. 5. Since filters 630 and 660 of FIG. 6 are linear, they may be cascaded in either sequence: filter 630 may provide pulse compression and filter 660 may provide sidelobe reduction, or vice versa. Also, as is well known in the art, the functions of filters 630 and 660 may be combined into a single filter. The salient requirement of the abovementioned Urkowitz application is that the range sidelobe reduction function be provided individually for the signal component in each frequency bin. When this requirement is met, the range sidelobe suppression can be optimized for each frequency increment, and the suppression can be maintained.

The general scheme of matched filtering (i.e., pulse compression) and range sidelobe suppression is described in conjunction with FIG. 5. The combination of pulse compressor and range sidelobe suppression follows each of the complex multipliers. Since each complex multiplication removes the residual Doppler phase shift across the uncompressed pulse, no residual Doppler phase shift remains on the uncompressed pulse. Each pulse compressor and range sidelobe suppressor is a zero Doppler design. All of the pulse compressor and range sidelobe suppressors are therefore identical in the arrangement described in the aforementioned Urkowitz application.

The above discussion is general in the sense that the range sidelobes need not have shapes and structure that are related to the shape of the main lobe. However, as mentioned earlier, in some instances the sidelobes are displaced and reduced versions of the main lobe. This is particularly true in the case of polyphase sequences and binary phase sequences in which the dwell at each phase defines a subpulse or "chip" interval. In such cases, the sidelobe suppression filter taps and some of the pulse compression filter taps need not be as densely spaced as the range sampling period $\tau_0$. The tap spacing need only be equal to the chip or subpulse duration $\tau$ when the sidelobes are displaced, reduced-amplitude versions of the main lobe. Signals having this property consist of subpulses or chips, each of which is a simple single-frequency subpulse. The subpulses are distinguished from one another by their phase, which changes according to a phase sequence pattern or law.

Figure 7:
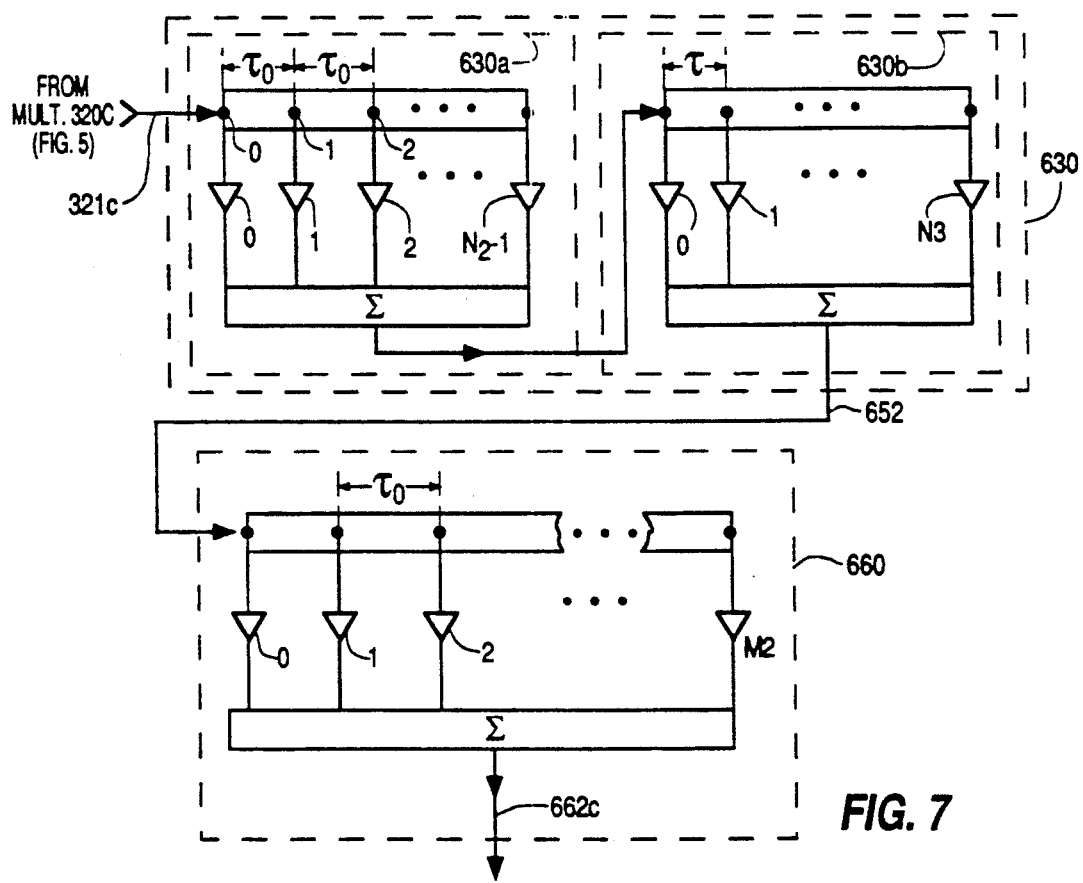
FIG. 7 is a simplified block diagram of another embodiment of a pulse compression and sidelobe suppression filter which may be used in the arrangement of FIG. 5, in which range-sample-rate and chip-rate filters are separated.

For such waveforms, the matched filters may take on the form illustrated in FIG. 7. In FIG. 7, elements corresponding to those of FIG. 6 are designated by the same reference numerals.

In FIG. 7, pulse compression filter 630 is seen to consist of the cascade of two separate transversal filter portions 630a and 630b. Filter portion 630a is matched to the form of the subpulse, and filter portion 630b is matched to the subpulse-to-subpulse pattern or phase sequence of the set of subpulses. The spacing between taps on subpulse-matched filter portion 630a is the range sampling period or interval $\tau_0$. The spacing between taps on pattern-matched filter portion 630b is the subpulse spacing $\tau$, which is larger than the range sample spacing $\tau_0$. Range sidelobe suppression filter 660 of FIG. 7 also has its tap spacing equal to the subpulse spacing $\tau$.

In FIG. 7, the number of taps associated with subpulse-matched filter portion 630a is $N_2$, i.e. $N_2-1$ plus the tap numbered zero, and those taps are spaced in time by range sampling interval $\tau_0$. Similarly, pattern-matched filter portion 630b has $N_3$ taps separated by subpulse spacing $\tau$, where $\tau$ is an integer multiple of $\tau_0$. Range sidelobe suppression filter 660 of FIG. 7 has $M_2$ taps, also spaced $\tau$.

The output of pulse compression filter 630 on data path 652 is the time sampled version of the signal time autocorrelation function. That is, the signal component is the time sampled version of the compressed pulse. This signal component is the input to range sidelobe suppression filter 660.

The weights or weighting functions associated with pattern matched filter 630b are the conjugate time reverses of the pattern of $\cos \theta_n$, where $\theta_n$ is the pattern of phase changes in the transmitted waveform.

As described above, range sidelobe suppression filter 660 has taps that are separated by a subpulse duration when the transmitted signal waveform is a binary phase or polyphase sequence. Particular classes of binary phase sequence are the Barker sequences and the pseudorandom sequences. The pseudorandom sequences permit much freedom in making a choice of sequence length, while it is frequently necessary to concatenate Barker sequences to get long sequence lengths. Barker sequences are restricted to lengths 2, 3, 4, 5, 7, 11 and 13. To get, for example, a sequence of length 65, one could concatenate 5 sequences of length 13 arranged in a particular pattern. Although the sidelobe structure is not as simple as that of a single Barker sequence, better suppression of sidelobes is believed to be obtainable with concatenated Barker sequences than with other forms of binary phase sequences, such as pseudorandom sequences of similar length, when processing is performed as described above.

As shown in FIG. 7, and described above, the pulse compression for biphase and polyphase sequences may be considered as the cascade of a filter matched to a single subpulse and a filter matched to the pattern of phase changes. In most circumstances, the Doppler phase shift across a subpulse is very small and is negligible. In such circumstances, the subpulse matched filter may be placed before the Doppler filter bank as illustrated in FIG. 8. Elements of FIG. 8 corresponding to those of FIG. 3 are designated by the reference numerals. In FIG. 8, a subpulse-matched filter corresponding to filter 630a of FIG. 7 receives I+jQ signals from port 210. The subpulse-filtered signals are applied to Doppler filter bank 216 for separation into narrow frequency bands. The filtered signals from filter element $f_0$ are at baseband, and they are applied over a data path 301 to a pattern-matched filter 830a, corresponding to filter 630b of FIG. 7. The filtered signals produced at the outputs of filter elements $f_1 \ldots f_{M-1}$ are each applied to a mixer 320 for conversion to baseband, as described above, and the resulting baseband signals are each applied to a further pattern-matched filter 830. For example, the output of filter element $f_2$ is converted to baseband by a multiplier 320b, and the resulting baseband signal is applied to pattern-matched filter 830b. The signals filtered by pattern-matched filters 830a–830m are then applied to further filters 860a–860m, respectively, for range sidelobe filtering. The resulting signals are individually applied to corresponding detectors 218 for detection. The detected signals, representing the energy found in each Doppler filter band, are coupled for thresholding or other further processing.

Thus, one subpulse matched filter will serve for all Doppler frequency shifts. Since only one subpulse matched filter is needed, it may be placed anywhere before the Doppler filter bank, including in the analog portion of the receiver, as an analog filter. As an analog filter, it may take many forms, including that of an surface acoustic wave (SAW) device.

The arrangements described above have relatively complex filtering in each Doppler channel following the Doppler filter. It is possible to simplify the filtering andor improve the range sidelobe rejection according to the invention by selection of the transmitted pulse phase sequence to include complementary phase sequences, together with provision of matched filtering for each sequence, followed by summing of the two matched-filtered sequences. This is effective because, in short, the selection of complementary-phase-sequence pairs causes the range sidelobes of the two filtered sequences to be of mutually opposite amplitude or polarity so that, when summed, the range sidelobes cancel while the main range lobes add. This eliminates the need for separate range sidelobe suppression filters.

In order to perform the invention, transmitter controller 3 of FIG. 1 must cause each transmitted pulse (each sequence of phase-modulated subpulses or chips) to be matched or accompanied by a corresponding transmitted pulse in which the phase sequence of the subpulses is complementary to the first phase sequence. For this purpose, the term complementary means that the sum of the time autocorrelation functions of the two pulse sets or sequences ideally has no sidelobes outside of the main lobe. Waveform 1000 of FIG. 10a represents a pulse formed from four subpulses or chips 1001, 1002, 1003 and 1004, having amplitudes of 1, −1, 1, 1, respectively, which may be viewed as unit vectors with relative phases of 0, $\tau$, 0, 0, respectively. FIGS. 10a–10i (where the hyphen represents the word "through") represent steps in forming an autocorrelation function, and FIGS. 10j–10s represent the result of the autocorrelation. As is well understood by those skilled in the art, autocorrelation "scans" the time function across a corresponding time function "moving" in the negative time direction, multiplying together the "overlapping" portions and summing the products. For example, an autocorrelation is performed on waveform 1000 of FIG. 10a by allowing it to stand still (or move to the right), while causing a similar waveform 1000′, including subpulses 1001′, 1002′, 1003′ and 1004′ to move to the left, as indicated by the direction arrows in FIG. 10a. In FIG. 10a, waveforms 1000 and 1000′ do not overlap, so their product is zero, and no output signal is produced, as illustrated in FIG. 10j. While the amplitudes of the positive and negative excursions of both pulses 1000 and 1000' are unity, pulse 1000' is illustrated as slightly larger than pulse 1000 to allow them to be visually distinguished. In FIG. 10b, corresponding to time interval 0-1 (where one time interval corresponds to the duration of a subpulse or chip), subpulses 1004 and 1001' overlap, both are positive so their product is positive, and the overlap region is increasing in area, so the resulting autocorrelation 1010 is a positive-going ramp increasing from zero amplitude, as illustrated between times 0 and 1 in FIG. 10k.

At the end of time interval 0 to 1, the overlap of subpulses 1004 and 1001' is complete, and ramp 1010 of FIG. 10k reaches a maximum value of 1. Immediately thereafter, negative subpulse 1002' begins to overlap positive subpulse 1004, while positive subpulse 1001' moves to the left, to overlap portions of subpulse 1003, as illustrated in FIG. 10c. The product of subpulse 1001' multiplied by portions of subpulses 1004 and 1003 remains constant in the time interval 1-2, while the product of negative subpulse 1002' multiplied by portions of positive subpulse 1004 increases in magnitude, with a negative sign. The sum of these products in the time interval 1 to 2 is a negative-going ramp portion of waveform 1010, as illustrated in FIG. 10m. At time 2, positive subpulse 1001' overlaps positive subpulse 1003 for a product of +1, and negative subpulse 1002' overlaps positive subpulse 1004, for a product of −1, the net of which is zero, as illustrated by plot 1010 in FIG. 10n at time 2. In the time interval 2 to 3, the summed product continues to ramp toward a value of −1, as illustrated in FIG. 10n.

In the time interval 3 to 4, waveforms 1000 and 1000' move toward congruence, as illustrated in FIG. 10e. The main autocorrelation lobe peaks during congruence of identical waveforms. At time 4, congruence is reached, with positive subpulse pairs 1001, 1001'; 1003, 1003', and 1004, 1004', and negative subpulse 1002, 1002' overlapping for a total magnitude of 4, as illustrated in FIG. 10p.

Following time 4 represented in FIG. 10p, waveforms 1000 and 1000' move away from congruence, as illustrated in FIG. 10f. The negative subpulses, 1002 and 1002' have significant overlaps with positive subpulses, and the overlap of positive subpulses 1001' and 1004 with their counterparts is progressively reduced in the time interval 4-5, resulting in a sharp drop of the autocorrelation toward a value of −1, as illustrated in FIG. 10q near time 5. From the above description, the mode of generation of autocorrelation waveform 1010 in the time interval 5-8, illustrated in FIGS. 10r and 10s, will be apparent, based upon the subpulse overlaps illustrated in FIGS. 10h and 10i.

FIG. 11a illustrates a pulse 1100 including subpulses 1101, 1102, 1103 and 1104. Pulse 1100 is complementary to pulse 1000 of FIG. 10 as defined above, because its autocorrelation, illustrated as 1110 of FIG. 11b, has range sidelobes in the time intervals 0-3 and 5-8 which are of the same amplitude, and of opposite polarity to those of FIG. 10s. When waveforms 1010 and 1110 are summed, the sidelobes in the intervals 0-3 and 5-8 cancel, leaving only the main lobe in the interval 3-5, as illustrated by waveform 1200 of FIG. 12.

FIG. 13 illustrates a sequence of transmitted pulses. In FIG. 13, the transmitted sequence includes a plurality M/2 of "A" pulses 1310 transmitted in sequence, switching over at a time T to a similar sequence of a like number M/2 of "B" pulses, for a total of M pulses. The A and B pulses are mutually complementary as described in conjunction with FIGS. 10, 11 and 12. More particularly, each of the "A" pulses 1310 may correspond to the four-subpulse sequence 1000 of FIG. 10, and each of the "B" pulses 1312 may correspond to four-subpulse sequence 1100 of FIG. 11. Since the number of A and B pulses are equal, they may be associated together in simultaneous complementary pairs by relatively delaying the earlier-occurring A pulses.

When the transmitted sequence is that of FIG. 13, the arrangement of FIG. 14 may be used to process the received complex I+jQ signal. In FIG. 14, elements corresponding to those of FIG. 5 are designated by the same reference numerals. As described in conjunction with FIG. 5, the uncompressed received I+jQ signals, representing the return from the target, are applied by way of terminal 210 to Doppler filter bank 216, in which the signal is filtered into various frequency bands. As is well known, the Doppler filter bank may be implemented by means of a Discrete Fourier Transform (DFT), usually in the form of Fast Fourier Transform (FFT) algorithm. The DFT operates on the entire sequence of M echoes, disregarding the fact that M/2 of the echoes come from one of the two input sequences, and the other M/2 echoes come from the other sequence of the complementary sequence. The output from each filter of filter bank 216 is at a different frequency, depending upon the Doppler components imparted to the returned signal by the target's radial velocity. As in the case of the FIG. 5 arrangement, the output from filter element $f_0$ of filter bank 216 is at baseband, and requires no heterodyning. As also described in conjunction with FIG. 5, the output the remaining filter elements $f_1$, $f_2$ . . . $f_{M-1}$ of filter bank 216 are applied to multipliers for heterodyning with a complex exponential wave having a frequency which is the negative of the Doppler frequency to which the associated filter responds. This process removes the Doppler frequency shift across each uncompressed pulse.

The baseband signal derived from each filter of filter bank 216 (by means of a multiplier in the case of frequency bands $f_1-f_{M-1}$) is applied to a single pole, double throw switch associated with that filter. For example, the output of filter element $f_0$ of filter bank 216 is applied to the common or movable element of a single pole, double throw switch illustrated in FIG. 14 by a mechanical switch symbol 1410a, which includes contacts 1412a and 1414a. Those skilled in the art know that mechanical switches are not used, and that solid state transmission switches suitable for the number of parallel bits in each data path are used instead. Similarly, the output of filter element $f_1$ of filter bank 216 is applied, by way of a mixer 320b, to the common element of a single pole, double throw switch 1410b, which is associated with contacts 1410b and 1414b. The highest-frequency filter element of filter bank 216, namely filter element $f_{M-1}$, has its output applied by way of a mixer 320m to the common element of a single pole, double throw switch 1410m, which is associated with contacts 1412m and 1414m. As illustrated in FIG. 14, switches 1410a, 1410b, 1410c, . . . 1410m are illustrated as being in contact with contacts 1412a, 1412b, 1412c . . . 1412m, respectively. The common elements of switches 1410 are ganged or coupled together so that all the moveable portions switch to contact their respective contacts 1414 simultaneously.

Each contact 1412 is connected to the input of a matched filter 1416 which is matched to subpulse sequence A of FIG. 13. For the example in which a 4-subpulse sequence such as the subpulse sequence 1001, 1002, 1003, 1004 of pulse 1000 FIG. 10 is used, each matched filter 1416 responds to the corresponding chip pattern 1, −1, 1, 1. Thus, contact 1412a is connected to the input of matched filter 1416a. Similarly, switch contact 1412b is coupled to the input of a matched filter 1416b which is matched to the same A sequence. Similarly, contact 1412m is coupled to the input of matched filter 1416m which is matched to subpulse sequence A.

Each terminal 1414 of switches 1410 is coupled to a corresponding filter 1418, which is matched to subpulse sequence B of FIG. 13. For example, switch contact 1414a is coupled to the input of a matched filter 1418a, which is matched to subpulse sequence B of FIG. 13. Similarly, switch contact 1414c is coupled to the input of filter 1418c which is also matched to subpulse sequence B of FIG. 13. The position of movable elements 1410 determine whether the baseband signals derived from the filter elements $f_0 - f_{M-1}$, are applied to filters matched to the A or B sequences. In the illustrated position of movable switch elements 1410, the A-matched filters are connected.

The outputs of A matched filters 1416 are coupled to corresponding delay elements 1420. For example, the output of matched filter 1416b is coupled to the input of a delay element 1420b, and the output of a matched filter 1416m is coupled to the input of a delay element 1420m. Each delay element 1420 delays the signal passing therethrough by a time duration equal to that of M/2 pulses. The outputs of delay elements 1420 are applied to inputs of a corresponding set of adders (+) or summers 1422, which also receive the outputs of the associated B matched filters 1418. Thus, the output of A matched filter 1416a is applied to a first input port of an adder 1422a by way of a delay 1420a, and the output of B matched filter 1418a is coupled to a second input port of adder 1422a. Similarly, the output of A matched filter 1416c is applied to a first input port of an adder 1422c by way of a delay 1420c, and the output of B matched filter 1418c is coupled to a second input port of adder 1422c.

In operation, transmitter 3, with T/R switch 50 and antenna 18 of FIG. 1, transmits one or more matched, complementary pairs of pulses of electromagnetic radiation toward a target. The echoes from the target are received, downconverted, processed and converted to digital form, and the uncompressed stream of pulses is applied to Doppler filter bank 216 of FIG. 14. The response of each filter element of bank 216, if not at baseband, is converted to baseband by multipliers or mixers 320, and each baseband signal, representing the signal in each Doppler filter band, is applied to a switch 1410, positioned as illustrated for coupling the signals to A matched filters 1416. The A matched filters respond to the sequence of A pulses, if present in the Doppler channel, by producing progressively greater response peaks as the filters "fill" with matched signal. At the moment when each A matched filter 1416 is "full", the filter output is a maximum. Thus, the A matched filter produces a time-compressed filtered representing by its time of receipt the target range, and by its derivation from a particular Doppler frequency band representing the radial speed of the target. The A filtered signal undesirably includes a plurality of sidelobes. Each A filtered signal is applied from its filter 1416 to a delay 1420, which delays for a duration, MT/2, where T is the pulse repetition period. The delay of MT/2 is equal to the duration of the A pulse sequence.

The time at which the switches 1410 switch from the A to the B filters may be any time during transmission of the first pulse following the initial group of M/2 pulses, and during the first pulse of each set of M/2 pulses thereafter. During transmission of the pulse, nothing can be received anyway, so any time during the pulse will be satisfactory.

At a time T/4 after the peak response of filters 1416 occurs, i.e. when the B sequence returns begin to be processed by the matched filters, switches 1410 are switched to their alternate positions (not illustrated in FIG. 14). In their alternate positions, the baseband signals in each Doppler channel are each applied to a B matched filter 1418. The B sequence (if present in a particular Doppler channel) "fills" the B sequence matched filter for that channel, and the filter response increases toward a maximum value, which occurs when the B matched filter is "full." Thereafter, the response of the B matched filter decreases. The outputs of the B matched filters are applied to the corresponding adders 1422, with the peak B response arriving at the adder at the same time as the peak A response from the associated delay element 1420. The peak responses are in-phase and of the same polarity, and they add to produce the main range lobe. The sidelobes produced by the A and B sequences, however, are of mutually opposite polarity, and tend to cancel in each adder. Thus, the range sidelobes are reduced by mutual cancellation when complementary pulse sequences are transmitted, without the use of separate range sidelobe reduction filters. The resulting signals in each Doppler channel are coupled to detectors (not illustrated in FIG. 14) for further processing.

It should be noted that the AAA ... AABB ... BBB pulse sequence is not the only possible sequence, as sequences such as ABABAB ... AB or AABBAABB ... are also paired. So long as the sequences are summed so that the range sidelobes cancel, any sequences can be used. Other possibilities include ABCDABCDA ... ABCD where A and B are mutually complementary, and C and D are mutually complementary. With appropriate storage of all M echoes, the matched filters would be selected and switched accordingly, and appropriate delays and summing provided.

As described above, the range sidelobes tend to cancel. If the input Doppler shift is not exactly equal to the center frequency of a Doppler filter element of filter bank 216, the range sidelobes may not cancel exactly, but the deterioration in the cancellation will not exceed that caused by a frequency shift equal to half the bandwidth of a filter element. Normally, this equals half the frequency spacing between adjacent filters of the filter bank.

FIG. 15a is a simplified block diagram of another arrangement for performing matched filtering of complementary pulse sequences in accordance with the invention. Elements of FIG. 15c corresponding to those of FIG. 14 are designated by like reference numerals. In FIG. 15, the baseband ($f_0$) signals in each Doppler channel are applied to switched-tap transversal filters 1514. For example, the baseband signal from multiplier 320b in the $f_1$ Doppler channel is applied by way of a data path 1512b to a switched-tap transversal filter 1514b, and the baseband signal from multiplier 320m in the $f_{M-1}$ Doppler channels is applied to a similar filter

1514*m*. The f₀ Doppler channel, already being at baseband, does not require a multiplier 320.

FIG. 15*b* illustrates a representative switched-tap transversal filter 1514. For definiteness, FIG. 15*b* represents filter 1514*b* of FIG. 15*a*. In FIG. 15*b*, the baseband signals are received on data path 1512*b* and are applied to a delay line or shift register 1530, which propagates the signal to the right, past a plurality of taps 1532(0), 1532(1) ... 1532(N-1). Each tap is coupled to the inputs of a pair of weighting elements $h_A$ and $h_B$. For example, tap 1532(0) is coupled to the inputs of a pair of weighting elements $h_A(0)$ and $h_B(0)$, tap 1532(1) is coupled to the inputs of a pair of weighting elements $h_A(1)$ and $h_B(1)$, and other taps (not illustrated) are coupled to corresponding pairs of weighting elements. Last tap 1532(N-1) is coupled to the inputs of a pair of weighting elements $h_A(N-1)$ and $h_B(N-1)$.

The output of each weighting element $h_A$ is coupled to a first contact 1534A of a single pole, double throw switch illustrated as a movable mechanical element 1536. The output of each $h_B$ weighting elements is connected to the other contact, 1534B, of one of switches 1536. For example, the outputs of weighting element $h_A(0)$ and $h_B(0)$ are connected to contacts 1534A(0) and 1534B(0), respectively, of switch 1536(0), the outputs of weighting elements $h_A(1)$ and $h_B(1)$ are connected to contacts 1534A(1) and 1534B(1) of switch 1536(1), and the outputs of weighting elements $h_A(N-1)$ and $h_B(N-1)$ are connected to contacts 1534A(N-1) and 1534B(N-1), respectively, of switch 1536(N-1). Movable switch elements 1536 are all coupled to a combinatorial summing network 1538. Switches 1536 are ganged for simultaneous operation.

In operation, switches 1536 are thrown to the positions appropriate to the subpulse sequence of that one of the A and B sequences (or other sequences, as appropriate) which currently transverses the delay line. This connects the corresponding weighting elements ($h_A$ or $h_B$) in-line, so that the summing element 1538 responds to a match to the subpulse sequence. Consequently, a compressed pulse is generated on output data path 1540(*b*). At the appropriate time during the changeover between A and B received sequences, ganged switches 1536 are thrown to the alternate position (the position illustrated), thereby placing the $h_B$ weighting in-line. The filter then responds when the B sequence is matched, by producing a second compressed pulse on data path 1540*b*. Thus, it can be seen that a switched-tap filter produces sequential pulses on data path 1540*b* in response to the two complementary sequences.

Referring once again to FIG. 15*a*, the compressed pulse pair may appear on one or more data path 1540 if the target radial velocity includes components producing a Doppler shift within the Doppler channel bandwidth. The output of each filter 1514 is applied to a single pulse, double throw switch illustrated by a mechanical switch symbol 1516. Switches 1516 are ganged together, and are illustrated in the position selected for routing the first of the two compressed pulses to a delay 1520. Switches 1516 of FIG. 15*a* may be ganged with switches 1536 of FIG. 15*b* for simultaneous operation therewith. For example, the first (A) compressed pulse produced at the output of filter 1514*b* is routed by switch 1516*b* to a delay element 1520*b*, which delays for a time MT/2, as described in conjunction with FIG. 14. Switch 1516*b* then switches concurrently with arrival of the B pulse sequence at filter 1514*b*, and routes the B compressed pulse to a summing circuit 1522*b*, for summing with the delayed compressed A pulse, as described in conjunction with FIG. 14.

Mathematical support is based upon M. J. E. Golay "Multislit Spectrometry", published in J. Opt. Soc. Amer. Vol. 39, page 437, 1949; C. W. Erickson, "Clutter Canceling in Autocorrelation Functions by Binary Sequence Pairing", Res. and Dev. Rpt. 1047, U.S. Navy Electronics Lab, San Diego, CA, Jun. 13 1961; and R. M. Akita, "An Investigation of the Narrow-band and Wideband Ambiguity Functions for Complementary Codes", thesis, MS in EE, Naval Postgraduate School, Monterey, CA. June 1968. There are certain basic kernels of length 2, 10 and 26 subpulses. A kernel, for this purpose, is a basic length sequence pair which cannot be decomposed into shorter length pairs by reversing the steps of standard generating methods, described below. Complementary pairs may be formed from these basic kernels. Complementary sequences having lengths longer than the basic lengths may be formed by applying to the basic kernels one or more of the following generating steps: (a) complementing the codes, where complementing means complementing (inverting from + to −) each element of code A or code B of a sequence pair; (b) time inversion of either or both A and B sequences of a complementary pair, where time inversion means interchanging first and last elements of a sequence, second and penultimate, third and antepenultimate ...; (c) complementing every other element of each sequence of a complementary pair. Two binary sequences or codes are said to be complementary if they are of equal length, and if their time autocorrelation functions have equal main lobes in sign and magnitude, and sidelobes that are equal in magnitude but opposite in sign. The autocorrelations of such complementary sequences add to zero for all time differences except zero time difference, at which the sum equal twice the length of either sequence, multiplied by the amplitude.

Other methods for generating include the following:

---

Other Method I
  If
    $A = a_1, a_2, \ldots, a_n$
    $B = b_1, b_2, \ldots, b_n$
  is a complementary pair, then
    $C = a_1, \ldots, a_n, \underline{b_2}, \ldots, \underline{b_n}$
    $D = a_1, \ldots, a_n, b, \ldots, b_n$
  is a complementary pair, where the overbar indicates the complement.

Other Method I
  If
    $A = a_1, \ldots, a_n$
    $B = b_1, \ldots, b_n$
  is a complementary pair, then
    $C = a_1, \underline{b_1}, a_2, b_2, \ldots, a_n, \underline{b_n}$
    $D = a_1, b_1, a_2, b_2, \ldots, a_n, b_n$
  is a complementary pair.

Known kernels are
  (a) for length 2,
    $A = \{- -\}$
    $B = \{- +\}$
  The possible sequence lengths for such a kernel are $2^n$, where n is an integer, $n \geq 1$. Examples include the kernel itself, or, by application of "Other Method II."
  $A = \{- - - +\}$, $B = \{- + - -\}$.
  (b) for length 10, one kernel is
    $A_1 = \{- + + - + - + + + -\}$
    $B_1 = \{- + + + + + + - - +\}$
  the other length 10 kernel is
    $A_2 = \{+ - + - + + + + - -\}$
    $B_2 = \{+ + + + - + + - - +\}$
  The possible sequence lengths formed from -continued either of these length 10 kernels is $10(2^n)$, where n is an integer, $n \geq 0$.

(c) for length 26

A = {+ − + + − − + − − − − + − + − − − − + + − − − + − +}
B = {− + − − + + − + + + + − − − − − − − + + − − − + − +}

The possible sequence lengths for length 26 kernels are $26(2^n)$, where n is an integer, $n \geq 0$.

Table I tabulates the lengths of complementary pairs formed from the abovedescribed known kernels of lengths 2, 10 and 26.

TABLE I

| KERNEL LENGTH | 2 | 10 | 26 |
|---|---|---|---|
| SEQUENCE LENGTH | 2 | 10 | 26 |
| | 4 | 20 | 52 |
| | 8 | 40 | 104 |
| | 16 | 80 | 208 |
| | 32 | 160 | 416 |
| | 64 | 320 | 832 |
| | . | . | . |
| | . | . | . |
| | . | . | . |

Other embodiments of the invention will be apparent to those skilled in the art. For example, while a radar context is described in which electromagnetic radiation is directed toward a target, acoustic waves in a fluid medium could as easily be used, as in a sonar system, or other anomaly detector. While binary phase sequences have been described, other phase variations, such as continuous analog phase variations, may be used, so long as appropriate processing is used, and the autocorrelation functions have the desired property of low range sidelobes.

What is claimed is:

1. A method for detecting anomalies, comprising the steps of:
   transmitting toward an anomaly a first pulse set consisting of a predetermined plurality of first pulses, said pulses of said first set being dispersed in time pursuant to a predetermined phase code;
   transmitting toward said anomaly a second pulse set consisting of said predetermined plurality of second pulses, said pulses of said second set being dispersed in time pursuant to a second phase code selected to be complementary to said predetermined phase code in a manner such that, after pulse compression of said first and second pulses, the resulting range sidelobes are substantially equal in amplitude and opposite in sign;
   receiving echoes of said first and second pulses reflected from said anomaly to produce received first and second pulse sets;
   Doppler filtering said received first and second pulse sets into a plurality of frequency components to produce a sequence of range values for each frequency component, each of said sequence of range values including said first and second code sequences;
   for each said frequency components, matched filtering each of said first and second code sequences of range values to produce first and second compressed pulses;
   summing said first and second compressed pulses; and
   after said Doppler filtering step, converting at least some of said plurality of frequency components to a common frequency.

2. A method according to claim 1, wherein said transmitting steps each include the step of transmitting an electromagnetic pulse set.

3. A method according to claim 1, wherein said transmitting steps are time-sequential.

4. A method according to claim 1 wherein said step of matched filtering includes the steps of:
   matched filtering said first pulses; and
   matched filtering said second pulses following said step of matched filtering said first pulses.

5. A method according to claim 1, wherein said step of converting at least some of said plurality of frequency components to a common frequency includes the step of converting at least some of said plurality of frequency components to a common baseband frequency.

6. A method according to claim 1, wherein said transmitting steps are performed in time sequence, and said summing step includes the further step of delaying the earlier of said first and second compressed pulses.

7. A method according to claim 6, wherein said delaying step comprises the step of delaying by the duration of one of said first and second code sequences.

8. An apparatus for detecting targets, comprising:
   code generating means for generating first and second complementary code sequences, said first and second complementary codes being selected so their autocorrelations have main lobes of the same polarity, and sidelobes of the same amplitude and mutually opposite polarity;
   transmitting means coupled to said code generating means for transmitting electromagnetic pulses modulated by said first and second complementary codes;
   receiving means for receiving echoes of said pulses reflected from a target, for producing a sequence of range values of received first and second pulse sets, said received first pulse set being modulated by said first code sequence, and said received second pulse set being modulated by said second code sequence;
   Doppler filtering means including a plurality of Doppler channels, said Doppler filtering means being coupled to said receiving means, for filtering said received first and second pulse sets into a plurality of frequency components, each associated with one of said Doppler channels, for producing in at least one of said Doppler channels, if the radial velocity of said target is appropriate, a sequence of range values including said first and second code sequences;
   matched filtering means coupled to each of said Doppler channels, for selectively matched filtering said first and second code sequences to thereby produce first and second compressed pulses, respectively;
   summing means coupled to said matched filtering means for summing together said first and second compressed pulses, whereby the main lobes of said compressed pulses add, and the sidelobes tend to cancel;
   wherein said matched filtering means comprises single pole, double throw switch means coupled to each of said Doppler channels for selectively switching said sequence of range values including said first code sequence to a first path, and for selectively switching said sequence of range values including said second code sequence to a second path;

first code matched filter means matched to said first code sequence coupled to said first path; and second code matched filter means matched to said second code sequence coupled to said second path.

9. An apparatus according to claim 8, wherein said switch means further comprises:

switch control means for controlling said switch means by switching said switching means at a time near the first pulse transmitted in response to of said first and second complementary code sequences.

10. An apparatus according to claim 8, wherein said code generating means comprises means for generating first and second complementary binary codes.

11. An apparatus according to claim 10 wherein said transmitting means comprises means for transmitting electromagnetic pulses phase-modulated by said first and second complementary codes.

* * * * *